UNITED STATES PATENT OFFICE.

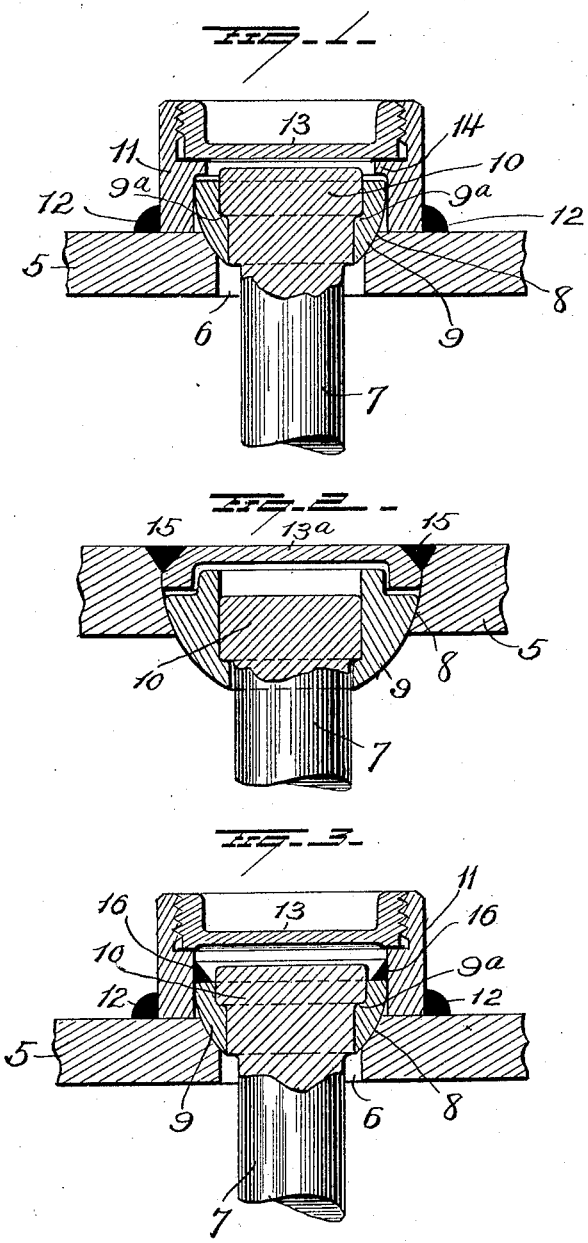

ETHAN I. DODDS, OF CENTRAL VALLEY, NEW YORK, ASSIGNOR TO FLANNERY BOLT COMPANY, OF PITTSBURGH, PENNSYLVANIA.

STAYBOLT STRUCTURE.

1,400,531.         Specification of Letters Patent.    Patented Dec. 20, 1921.

Application filed January 22, 1921. Serial No. 439,153.

*To all whom it may concern:*

Be it known that I, ETHAN I. DODDS, a citizen of the United States, and a resident of Central Valley, in the county of Orange and State of New York, have invented certain new and useful Improvements in Staybolt Structures; and I do hereby declare the following to be a full, clear, and exact description of the invention, such as will enable others skilled in the art to which it appertains to make and use the same.

My invention relates to an improvement in staybolt construction for boilers the object being to provide a bolt bearing member having a universal movement in the outer sheet of the boiler and a bolt having a longitudinal movement in its bearing member, so that the bolt may accommodate itself to any and all movements of the inner and outer sheets to which it may be attached, and it consists in the parts and combinations of parts as will be more fully explained and pointed out in the claims.

In the accompanying drawings; Figure 1 is a view in section of one embodiment of my invention; Fig. 2 is a similar view of the improvement applied to a bolt of the flush type and Fig. 3 is a view of a modification shown in Fig. 1.

5 represents the outer sheet of a boiler, having an opening 6 for the passage of a staybolt 7. In Fig. 1 the outer portion of this opening is concaved as shown at 8, to form a curved seat for the inner end of the bolt bearing member 9, the body of which latter is semi-spherical and rests within said curved seat 8 and is free at all times to have a universal movement in the said seat.

The bolt bearing member 9 provided with a cylindrical bore which is counterbored at its outer end to receive the cylindrical head 10 of the bolt 7, which latter is seated on the shoulder 9ª. The bolt is loosely mounted in the bearing member 9 and is free to move longitudinally therein, and this bearing member as before stated, has a universal mounting on the seat 8, so that with this construction the bolt may be adjusted to any inclination necessary within the limits required, and is free to accommodate itself to the movements of the unequal contraction and expansion of the two sheets to which it may be connected.

The bearing member 9 and bolt head 10 are housed by the sleeve 11, welded as at 12 to the outer sheet 5, and this sleeve is internally threaded at its outer end to be engaged by the external threads on the cap 13, which when in place, rests on the annular flange 14 on the sleeve 11, sufficient space being left between the outer end of the head of the bolt 7 and the cap, for the necessary or desirable longitudinal movement of the bolt.

With this construction the cap is removable for ready inspection and removal and replacement of the bolt and its bearing member 9.

In the construction shown in Fig. 2, the inner portion of the bolt opening in sheet 5 is concaved so that the bearing member 9 will be supported within the bolt opening and permit of the use of a flush cap 13ª which in the present instance is shown welded as at 15 to the outer sheet 5, thus dispensing altogether with the sleeve 11, shown in Fig. 1. In other respects it is substantially identical with the construction shown in Fig. 1.

In Fig. 3 I have shown the bolt bearing member 9 welded as at 16 to the inner face of the sleeve. With this construction the parts are assembled, and the bearing member 9 initially adjusted so that its axis is parallel with the bolt, after which it is welded to the sleeve, so that with this latter construction the bolt can move in a longitudinal direction only.

It is evident that many slight changes might be resorted to in the relative arrangement of parts shown and described without departing from the spirit and scope of my invention hence I would have it understood that I do not wish to confine myself to the exact construction and arrangement of parts shown and described but, Having fully described my invention what I claim as new and desire to secure by Letters-Patent, is:—

1. In a staybolt structure, the combination of a boiler sheet having a bolt opening the wall of which is concave, a semi-spherical bolt bearing member mounted on said concave seat and provided with a cylindrical bore and a bolt having a cylindrical head seated in the cylindrical bore of the bearing member so that the bolt can move longitudinally therein.

2. In a stay bolt structure, the combination of a boiler sheet having a bolt opening the wall of which is concave, a semi-spherical bearing member mounted in said opening and universally movable therein, the said bearing member having a cylindrical bore, and a bolt having a cylindrical head seated in the cylindrical bore of the bearing member and movable longitudinally therein.

3. In a stay bolt structure, the combination of a boiler sheet having a bolt opening the wall of which is concave, a semi-spherical bolt bearing member mounted on said concave seat and provided with a cylindrical bore, a bolt having a cylindrical head seated in the cylindrical bore of the bearing member so that the bolt can move longitudinally therein, and a cap covering the bolt head and bearing member for the latter.

4. In a stay bolt structure, the combination of a boiler sheet having a bolt opening the wall of which is concave, a semi-spherical bolt bearing member mounted in said concave seat and provided with a cylindrical bore, a bolt having a cylindrical head seated in the cylindrical bore of the bearing member so that the bolt may move longitudinally therein, a sleeve welded to the boiler sheet around the bolt opening and a cap removably secured to the outer end of the sleeve and covering the bearing member and bolt head.

In testimony whereof, I have signed this specification in the presence of a subscribing witness.

ETHAN I. DODDS.

Witness:
EDWIN SPENCER RYCE.